Figure 1:
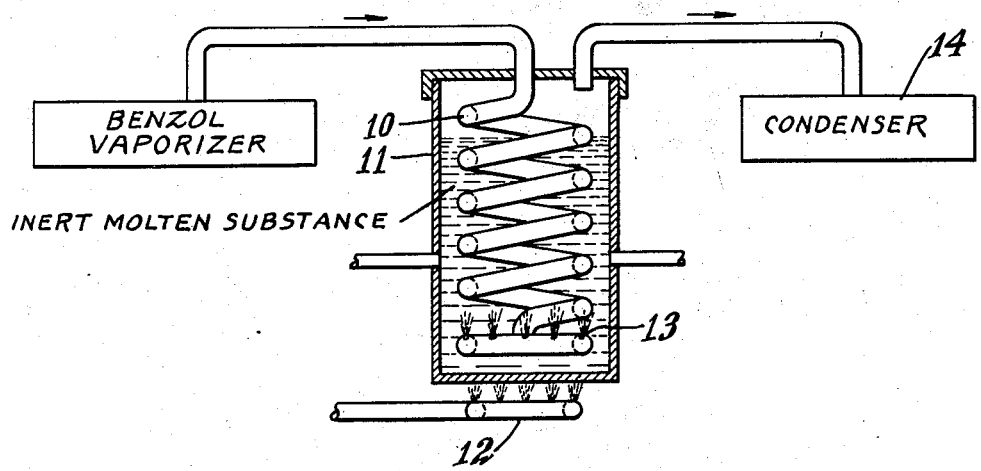

July 31, 1934. J. E. MOOSE ET AL 1,968,154
PROCESS FOR THE PRODUCTION OF DIPHENYL
Filed April 22, 1930

INVENTORS
J. E. Moose
W. N. Pritchard
BY
ATTORNEYS

WITNESS
Charles H. Bassett

Patented July 31, 1934

1,968,154

UNITED STATES PATENT OFFICE

1,968,154

PROCESS FOR THE PRODUCTION OF DIPHENYL

Joe E. Moose and William N. Pritchard, Anniston, Ala., assignors to Swann Research, Inc., a corporation of Alabama Application April 22, 1930, Serial No. 446,336

5 Claims. (Cl. 260—168)

Our invention relates to a process and apparatus for the production of diphenyl, particularly to a process in which the vapors of benzol are raised to a temperature at which the molecular structure thereof is broken down and diphenyl formed, and has for its object the provision of means whereby formation of carbon is wholly or substantially avoided and larger yields of diphenyl obtained.

A further object of our invention is to provide a process for the production of diphenyl by thermal synthesis wherein the benzol vapors when once raised to the diphenyl forming temperature may be retained at such temperature until equilibrium is closely approached, whereby increased yields of diphenyl may be obtained per pass of benzol vapors.

A still further object of our invention is to provide a process for the production of diphenyl by thermal synthesis wherein metal apparatus is employed for vaporizing the benzol and afterwards for heating the benzol vapors, and wherein catalytic action of the metal container is substantially prevented.

In the production of diphenyl from benzol as heretofore practiced, several methods have been employed with more or less success. In the earlier methods, benzol vapors were heated in a metallic tube to a temperature of around 800° C., at which temperature the molecular structure of benzol is broken down and diphenyl is formed. It was found, however, that with such a method, excessive amounts of tar and carbon were formed which soon stopped up the tube and interfered with the carrying out of the process.

It has recently been proposed to produce diphenyl by gradually heating the benzol vapors to the maximum permissible temperature at which substantially no diphenyl is formed, followed by a quick heating of the vapors to that at which diphenyl is formed, and then a quick cooling of the vapors. By thus reducing the time element during which the vapors are heated to a high temperature, excessive side reactions have been avoided and commercial yields have been obtained.

In our research as to the causes of the excessive production of carbon in carrying out the process of producing diphenyl by thermal synthesis, we have found that the longer the benzol vapors are retained at diphenyl producing temperature, the more nearly is equilibrium approached, and greater yields of diphenyl thus obtained. We have found that the production of excessive amounts of carbon are not necessarily brought about by the length of time at which the vapors are maintained at a relatively high temperature, but are brought about by catalytic action on the vapors by the metal container or conduit in which the vapors are confined. We have further found that most of the metals available for withstanding the high temperatures possess this catalytic property and that this catalytic action may be substantially prevented.

For example, if the metallic container in which the benzol vapors are heated be treated with certain chemical elements or compounds of elements, we have discovered that the carbon formation during diphenyl synthesis on the metallic surface can be largely, if not completely, prevented. The function of these substances in inhibiting carbon formation, we believe to be due to a catalytic poisoning effect.

The particular chemical elements or compounds of elements which we have found to be effective in inhibiting carbon formation, arranged in the order of their decreasing effectiveness, are as follows:

Se; CoS; Co; $K_2Cr_2(SO_4)_4$; $NiCl_2As$; CuS; Si; Sb; $SbCl_3$; Sn; $Sb_2S_5$; $MoS_x$; Mo; $P_2S_5$; $As_2S_6$; $SnS_x$; ZnS; FeS; $Na_4B_4O_7$; nichrome; Parkerized iron; CdS; $AlCl_3$; Fe; Zn; Ag; $VCl_3$; Fe pickled in $HNO_3$; Cd; Cu; $MnCl_2$; Al; ZnO; $CuCl_2$, wherein $x$ has a value of from 1 to 4.

The methods of applying these materials to an iron or steel surface will vary with the nature of the particular coating material. We have found it possible to effectively coat an iron or steel surface with the above inhibitors by the following methods:

(a) Metal coatings are applied by electroplating, displacement from solution, and by dipping. Some of the above metals are available in tube or sheet form and may be thus employed.

(b) *Sulphide coating*.—In the case of iron sulphide, the iron surface is sulphided by suspending it in a stream of hot hydrogen sulphide gas (600° to 800° C.), or in the vapor over boiling sulphur. In the case of other metal sulphides, the metals are applied as in (a) and then sulphided as in (b). Selenium may be applied in the same manner.

(c) Salt and oxide coatings are applied by dipping the moistened surface in the powdered salt and heating in an electric muffle surface at a red heat.

By means of suitable carbon formation inhibitors applied as above, it is possible to carry out the diphenyl synthesis reaction more efficiently than has been possible heretofore. For example, because of the protection afforded by the above mentioned inhibitors, it is possible to maintain the benzol vapors at diphenyl forming temperature until equilibrium is approached with a considerably lower production of carbon.

The above series of elements and compounds, arranged in the order of their decreasing effectiveness in inhibitng carbon formation, is useful in the same manner as is the electromotive series of the elements in electrochemistry. For example, if the diphenyl reaction is being carried out in iron tubes any of the substances preceding iron in the above series will decrease the formation of carbon, while those following iron will increase carbon. When working with a nichrome tube, any of the substances preceding nichrome will decrease the formation of carbon on nichrome. Hence when making diphenyl, such substances are desirable coating materials, while those following nichrome increase the amount of carbon formed, and hence are undesirable coating materials. In the same way a tube constructed of molybdenum will show a lower rate of carbon formation when coated with the substances preceding it in the series, and a greater rate when coated with those substances following it. It will accordingly be seen that every material used for a container for benzol vapors undergoing pyrolysis will have specific substances which will inhibit carbon formation and others which will accelerate carbon formation. Since, however, carbon formed represents benzene destroyed, the diphenyl yield is correspondingly decreased. It is, therefore, economically desirable to employ those substances as inhibitors which show the least carbon formation.

Figure 2:
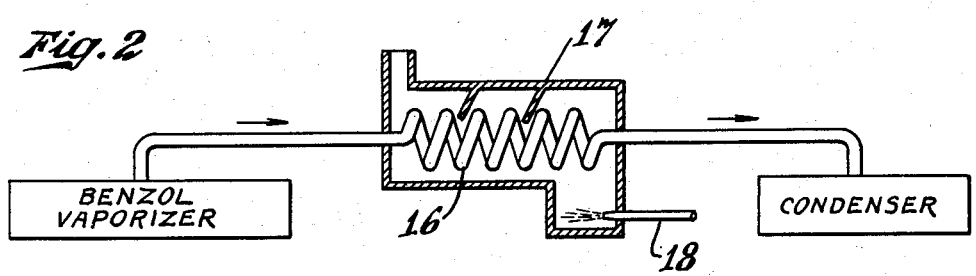
Figure 3:
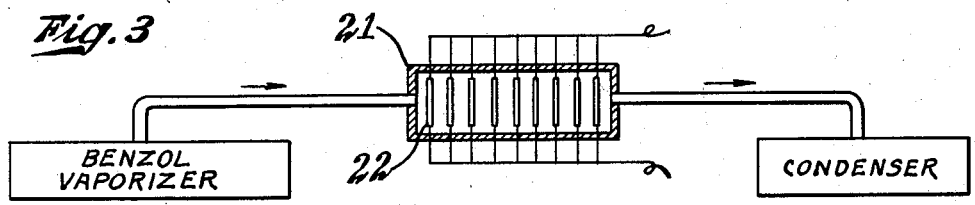

Referring to the diagrammatic drawing forming a part of this application, we show in Figs. 1, 2 and 3, different means whereby our invention may be carried out.

Referring first to Fig. 1, the benzol is vaporized in any suitable apparatus and the benzol vapors passed from the vaporizer into a coil 10 arranged within a vessel 11 provided with a suitable external heating means 12. The vessel 11 is substantially full of a molten substance inert with respect to the benzol vapors and maintained at a suitable temperature for forming diphenyl, say upwards of 800° C. The lower end of the coil 11 may be provided with openings 13 through which the vapors pass directly into the molten substance and bubble upwardly therethrough to provide agitation of the substance and to further heat the vapors by direct contact therewith. From the vessel 11, the vapors pass to a suitable condenser 14 where the diphenyl is condensed in a manner well understood.

The vessel 11 is made of metal and its interior surface is coated with a substance, as heretofore described, capable of poisoning it as a catalyst. It is also necessary that all conduits and parts of apparatus confining the vapors at high temperature should be provided with a protective coating.

The process illustrated in Fig. 2 contemplates passing the vapors through a coil 16 enclosed within a furnace 17 provided with any suitable heat supply means, such as a burner 18. The coil 16 should be coated on its interior surface with a suitable catalyst poison as before described. After passing through the coil 16, the vapors pass into a condenser as before described.

In accordance with Fig. 3 of the drawing, the benzol vapors are passed into a heating chamber 21 of relatively large capacity where their velocity is greatly reduced and wherein they are brought in contact with an electrical resistor 22 having a relatively large surface and heated to temperature sufficient to raise the vapors to diphenyl forming temperatures. From the heating chamber 21, the vapors pass to a condenser as before described.

The interior walls of the heating chamber 21, if made of metal, as well as the surface of the resistor 22, should be coated with a carbon inhibiting substance to prevent the formation of carbon and tarry deposits.

With any one of the processes described, the apparatus is so designed as to raise the temperature of the benzol vapors to that at which the molecular structure is broken down and diphenyl formed, and are maintained at such a temperature until equilibrium is approached, thereby providing for a maximum diphenyl yield.

While we have shown our invention in several forms, it will be obvious to those skilled in the art that it is not so limited, but is susceptible of various other changes and modifications without departing from the spirit thereof, and we desire, therefore, that only such limitations shall be placed thereupon as are imposed by the prior art, or as are specifically set forth in the appended claims.

What we claim is:

1. In a process for the production of diphenyl by thermal synthesis, heating benzol vapors to a temperature at which diphenyl is formed, confining said vapors at said temperature within ferrous walls until equilibrium is approached, and catalytically inhibiting the production of carbon while at diphenyl forming temperature, by coating said walls with a metal sulphide.

2. In a process for producing diphenyl by thermal synthesis, heating benzol vapors to a temperature around 800° C., confining the vapors at said temperature within ferrous containers until a substantial portion of the benzol is broken down to form diphenyl and hydrogen, and catalytically inhibiting carbon forming reactions while at said temperature, by coating the confining surfaces of the containing walls with a metal sulphide.

3. In a process for producing diphenyl by thermal synthesis from benzene, heating benzol vapors to diphenyl forming temperatures, said vapors being confined by means of ferrous elements, the surfaces of said elements being coated with a metal sulphide.

4. In a process for producing diphenyl in which benzol vapors are confined by ferrous elements and heated to diphenyl forming temperatures, the step comprising coating the walls of the confining elements with a metal sulphide.

5. In a process for producing diphenyl by thermal synthesis from benzene, heating benzol vapors to diphenyl forming temperatures, said vapors being confined by ferrous surfaces coated with a metal sulphide of the group consisting of $CoS$; $CuS$; $Sb_2S_5$; $MoS_x$; $P_2S_5$; $As_2S_5$; $SnS_x$; $ZnS$; $FeS$; wherein $x$ has a value of from 1 to 4.

JOE E. MOOSE.
WILLIAM N. PRITCHARD.